(12) United States Patent
Shiba

(10) Patent No.: US 9,453,911 B2
(45) Date of Patent: Sep. 27, 2016

(54) TARGET TRACKING SYSTEM AND TARGET TRACKING METHOD

(75) Inventor: Hisashi Shiba, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1276 days.

(21) Appl. No.: 13/363,419

(22) Filed: Feb. 1, 2012

(65) Prior Publication Data

US 2012/0223853 A1 Sep. 6, 2012

(30) Foreign Application Priority Data

Mar. 4, 2011 (JP) .................................. 2011/47350

(51) Int. Cl.
G01S 13/00 (2006.01)
G01S 13/72 (2006.01)

(52) U.S. Cl.
CPC .................... G01S 13/726 (2013.01)

(58) Field of Classification Search
USPC ............................ 342/90, 95, 98; 356/87, 93
See application file for complete search history.

(56) References Cited

FOREIGN PATENT DOCUMENTS

| JP | 2004309209 | 11/2004 |
|----|------------|---------|
| JP | 2007085825 | 4/2007 |
| JP | 2009098877 | 5/2009 |
| JP | 2009192550 | 8/2009 |
| JP | 2010210579 | 9/2010 |

OTHER PUBLICATIONS

Extended European search report, dated Oct. 27, 2014, in corresponding European Patent Application No. 12157685.4.
M. Sanjeev Arulampalam et al., "A Tutorial on Particle Filters for Online Nonlinear/Non-Gaussian Bayesian Tracking" IEEE Transactions on Signal Processing, vol. 50, No. 2, Feb. 2002, pp. 174-188.
Fredrik Gustafsson et al., "Particle Filters for Positioning, Navigation and Tracking" IEEE Transactions on Signal Processing, vol. 50, No. 2, Feb. 2002, pp. 1-13.
C. Hue et al., "Tracking Multiple Objects with Particle Filtering" IEEE Transactions on Aerospace and Electronic Systems. vol. 38, No. 3, Jul. 2002, pp. 791-812.
Xu Linzhou et al., "An Efficient Particle Filter with Variable Number of Particles for Bearings-Only Tracking," 2010 IEEE 10th International Conference on Signal Processing (ICSP), Oct. 24, 2010, pp. 2395-2398.
Japanese Office action, dated Oct. 28, 2014, in corresponding Japanese Patent Application No. 2011-047350, with partial English translation.

*Primary Examiner* — Dao Phan
(74) *Attorney, Agent, or Firm* — Young & Thompson

(57) ABSTRACT

A target tracking system which tracks targets using a plurality of virtual particles includes a detector which detects the targets based on a signal wave from the targets and outputs a detected results as a detected target positions, a fluctuation distribution unit which generates fluctuations arising from at least disturbances and measurement errors, and an estimation unit which sets virtual particles based on the fluctuations and estimates a true target positions based on the detected target positions.

8 Claims, 4 Drawing Sheets

TARGET TRACKING SYSTEM AND TARGET TRACKING METHOD

This application is based upon and claims the benefit of priority from Japanese Patent Application No. 2011-047350 filed on Mar. 4, 2011, the disclosure of which is incorporated herein in its entirety by reference.

TECHNICAL FIELD

The present invention relates to a target tracking system and a target tracking method in which a processing load when predicting a target position is reduced using a plurality of virtual particles.

BACKGROUND ART

As a method to detect and track targets using radar, sonar and lidar, Multiple Hypothesis Tracking (MHT) is used widely as shown in Japanese Patent Application Laid-Open No. 2009-192550, for example. Because MHT can track a plurality of targets, there are many derived methods which can cope with false detection and false rejection.

Basically, a track of a target is obtained by repeating processing in which a true target position in a current search is estimated from a prediction of a target position for the current search obtained using a detection result of a target position in the last search and a detection result of a target position in the current search, and, from this estimated result, a target position in the next search is predicted.

When performing prediction by MHT, Karmann filter is often used. On the other hand, when a frequency of false detection and false rejection of a target is not high, the scheme of MHT is not used, and targets are often tracked only by Karmann filter.

However, in recent years, a particle filter, as shown in the following document 1, which can also handle a case where a system model and an observation model are of a non-Gaussian system has come to be used widely.

Document 1: Tomoyuki Higuchi, "Particle Filter", Institute of Electronics, Information and Communication Engineers Journal, Vol. 88, No. 12, 2005.

The more accuracy is improved because a system model and an observation model are followed more correctly, when a particle filter is used, the larger the number of virtual particles is. However, on the other side of a coin, there is a problem that the calculation amount is increased. Further, about the number of virtual particles (hereinafter, also referred to as "virtual particle count"), a guideline for finding the most suitable number of particles has not been proposed until now.

SUMMARY

Accordingly, a main purpose of the present invention is to provide a target tracking system and target tracking method which can track targets with high accuracies while suppressing increase of the calculation amount even when a particle filter is applied to Multiple Hypothesis Tracking Method.

A target tracking system which tracks targets using a plurality of virtual particles includes a detector which detects the targets based on a signal wave from the targets and outputs detected results as detected target positions, a fluctuation distribution unit which generates fluctuations arising from at least disturbances and measurement errors, and an estimation unit which set virtual particles based on the fluctuations and estimates true target positions based on the detected target positions.

A target tracking method for tracking targets using a plurality of virtual particles includes a detection procedure for detecting the targets based on a signal wave from the targets and for outputting detected results as detected target positions, a fluctuation procedure for generating fluctuations arising from at least disturbances and measurement errors, and an estimation procedure for setting virtual particles based on the fluctuations and for estimating true target positions based on the detected target positions.

Since the true target positions are estimated based on the detected target positions and the virtual particles are set up based on the fluctuations in that case, the number of virtual particles used for estimation processing of the true target position can be done few. Therefore, even when applying a particle filter to the multiplex hypothetical following method, targets can be pursued with high precisions, controlling the amount of operations.

BRIEF DESCRIPTION OF THE DRAWINGS

Exemplary features and advantages of the present invention will become apparent from the following detailed description when taken with the accompanying drawings in which.

EXEMPLARY EMBODIMENT

First Exemplary Embodiment

Figure 1:
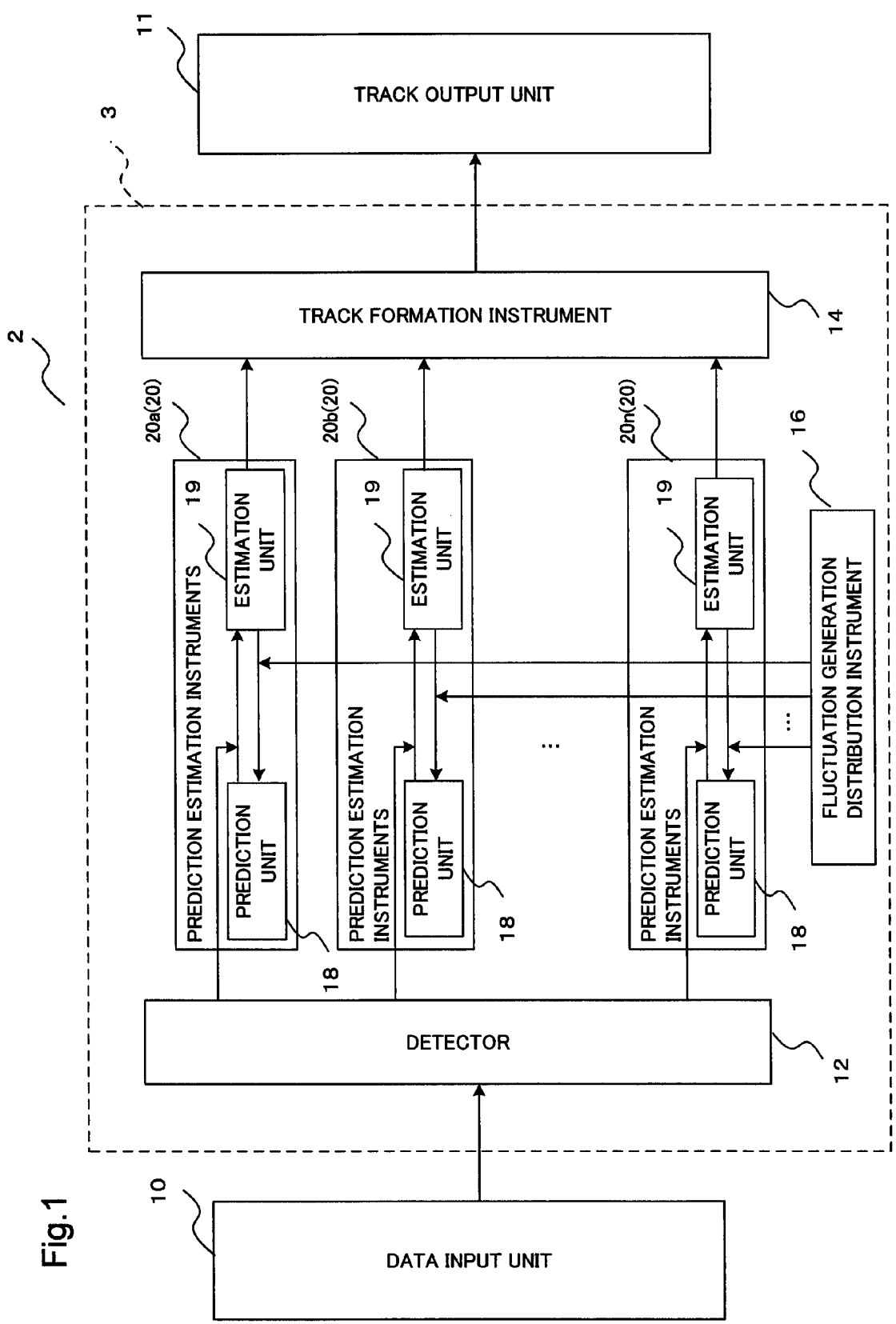
FIG. 1 is a block diagram of a target tracking system according to a first exemplary embodiment of the present invention.

An embodiment of the present invention will be described. FIG. 1 is a block diagram of a target tracking system 2 according to this exemplary embodiment. The target tracking system 2 includes a data input part 10, a target position estimation apparatus 3 and a track output part 11. The target position estimation apparatus 3 includes a detector 12, a plurality of estimation units 20, a fluctuation distribution unit 16 and a track formation unit 14. The estimation units 20 is formed by estimation units 20a-20n which has a same function, and each of the estimation units 20a-20n include a prediction part 18 and an estimation part 19. Meanwhile, n is a positive integer of no smaller than 1.

The data input part 10 is a radar, a sonar, a lidar or the like consists of at least one sensor element which acquires a received wave (signal wave) including continuous waveform information of the wave fluctuating in time series such as an amplitude, a phase, a modulation method of a radio wave, a sound wave, a light wave or the like.

Meanwhile, each sensor element is generally arranged in a straight line at half wavelength intervals when a plurality of sensor elements is arranged. However, this exemplary embodiment is not limited to such arrangement. For example, a structure in which respective sensor elements are arranged in a ring shape, a structure in which they are arranged to form a spherical shape and a structure in which they are arranged to form a crystal lattice shape and the like are possible. Although it is desirable that each sensor element has a same sensitivity behavior and wavelength characteristics and the like, this exemplary embodiment is not limited to this. That is, it is possible to apply the present invention even when each sensor element has a different sensitivity behavior and different wavelength characteristics.

The detector 12 performs a target position detection processing for detecting target positions based on received signals from the data input part 10. Detection results are outputted to the estimation units 20 as detected target positions.

On this occasion, the target position detection processing may be performed directly to signals received from the data input part 10, or, after performing conversion processing and the like by an orthogonal function such as Fourier transformation to received signals, a target position detection processing may be performed.

Publicly known methods can be applied to the target position detection processing. For example, as the simplest target position detection processing method, a method to compare a reflected wave reflected by a target and a transmission wave can be illustrated. Using a transmission wave as a template, this method takes a correlation between this transmission wave and a received wave including an echo, and, when the correlation factor is larger than a threshold value set in advance, detects a target position in the direction of reception of the received wave and from a time until the echo is received.

As another target detection processing methods, a method in which reflected waves (received waves) reflected from a target in various noise environments are registered in advance, and, using the registered reflected waves as templates, a target position is detected by obtaining a correlation between the templates and a received wave received at the time of detection of the target can be illustrated. In this case, a target position can be detected by learning registered templates in advance by a machine learning algorithm such as a neural network, a support vector machine and AdaBoost, and performing pattern recognition of a received wave based on these learning results.

This target position detection processing may also be carried out sequentially according to data input from the data input part 10, or may be carried out periodically at timing set in advance. It may be also carried out according to output from different sensors placed outside or to instructions from an operator.

Meanwhile, when target position detection processing is performed based on a received wave from an active sonar, because reflected waves by objects and the like which exist in close range from the sonar becomes remarkable for a certain time after a transmission wave is sent, target position detection errors becomes large if target positions are detected based on received waves including such reflected waves. Accordingly, in such cases, it is preferred that target positions are not detected based on received waves within such period of time.

The estimation part 19 performs position estimation processing in which true target positions at present are estimated based on detected target positions from the detector 12 and predicted target positions which the prediction part 18 mentioned later has predicted, and outputted as estimated target positions.

That is, as mentioned later, the prediction part 18 predicts target positions using a plurality of virtual particles for detected target positions detected by the detector 12. The estimation part 19 estimates true target positions at present based on detected target positions which the detector 12 has detected and predicted target positions which the prediction part 18 has predicted.

As a position estimation processing method, the following method can be illustrated. That is, a likelihood which indicates likelihood as a true target position is calculated for a predicted target position which the prediction part 18 has predicted for each virtual particle. Then, the average value of a plurality of predicted target positions which have been weighted using such likelihood as a weight is made be true target position estimation.

Meanwhile, as a calculation method of a likelihood, a method in which a value calculated by multiplying the reciprocal of a distance between each predicted target position and the detected target position or the reciprocal of the square of the distance by a fixed number is made be a likelihood can be used.

Also, a method in which a Mahalanobis distance that is made by dividing a distance between each predicted target position and the detected target position by an error covariance of positions of all virtual particles is calculated, and a value made by multiplying the reciprocal of the Mahalanobis distance or the reciprocal of the square of the Mahalanobis distance by a fixed number is made be a likelihood can be used.

Further, it is also possible to make a value made by multiplying an exponential function by a fixed number be a likelihood, the exponential function including a value made by multiplying the reciprocal of such distance or a Mahalanobis distance, or the reciprocal of the square of the distance or the Mahalanobis distance by a fixed number as an index.

The prediction part 18 stores a movement model in advance, and, based on the movement model and estimated target positions from the estimation part 19, performs position prediction processing for predicting and outputting predicted target positions using a plurality of virtual particles.

A movement model is a model including motion parameters such as an initial position, a speed and an acceleration of a target, and fluctuations arising from disturbances, measurement errors and the like to each motion parameter, the fluctuations being obtained from the fluctuation distribution unit 16 mentioned later. As a motion parameter, there is a method using linear uniform motion that is being adopted widely, for example.

Then, the estimated target positions from the estimation part 19 are applied to the movement model, and target positions at predetermined timing in the future after this moment set in advance is predicted for each detected target position using a plurality of virtual particles.

The fluctuation distribution unit 16 holds fluctuations arising from disturbances and measurement errors or the like of each motion parameter as random numbers of a distribution profile given in advance, and generates and outputs fluctuations of motion parameters such as an initial position, a speed and an acceleration of a target.

On this occasion, a generated fluctuation is set as follows. That is, among virtual particles for different detected target positions, it is set such that probability distributions of a fluctuation become the same shape while permitting that the total widths of the probability distributions are different from each other.

On the other hand, among the virtual particles for an identical detected target position, fluctuation probability distributions are set so that the widths of the fluctuation probability distributions are different from each other and also the shapes of the fluctuation probability distributions are different from each other.

As a generation method of fluctuations, a method using a pseudo-random function to generate numerical values of a given range uniformly, and a method using a pseudo-random function to generate numerical values such that the values show distribution of a specified shape such as the Gaussian can be applied. A publicly known method such as Mersenne Twister can be applied as a method to generate a pseudo-random number. As a method showing a Gaussian distribution, a publicly known method such as Box-Muller method, for example, can be applied.

In the track formation unit 14, true target positions obtained by the estimation units 20 are lined in time series to form a track. For example, formation of a track becomes possible by storing estimated positions obtained for each search in a memory, and, about each estimated position, simultaneously storing a pointer indicating an area (address) of the memory which stores the previous estimated position by the last search by which the current estimated position has been calculated.

In the track output part 11, formed tracks are stored in an external storage or the like temporarily, and they are outputted to an external display apparatus or the like. As an external storage, a hard disk, SSD (Solid State Drive), Blue-ray and DVD (Digital Versatile Disc) or the like is applicable, for example. Also, as an external display apparatuses, a television monitor, a computer display and a projector or the like is applicable, for example.

Figure 2:
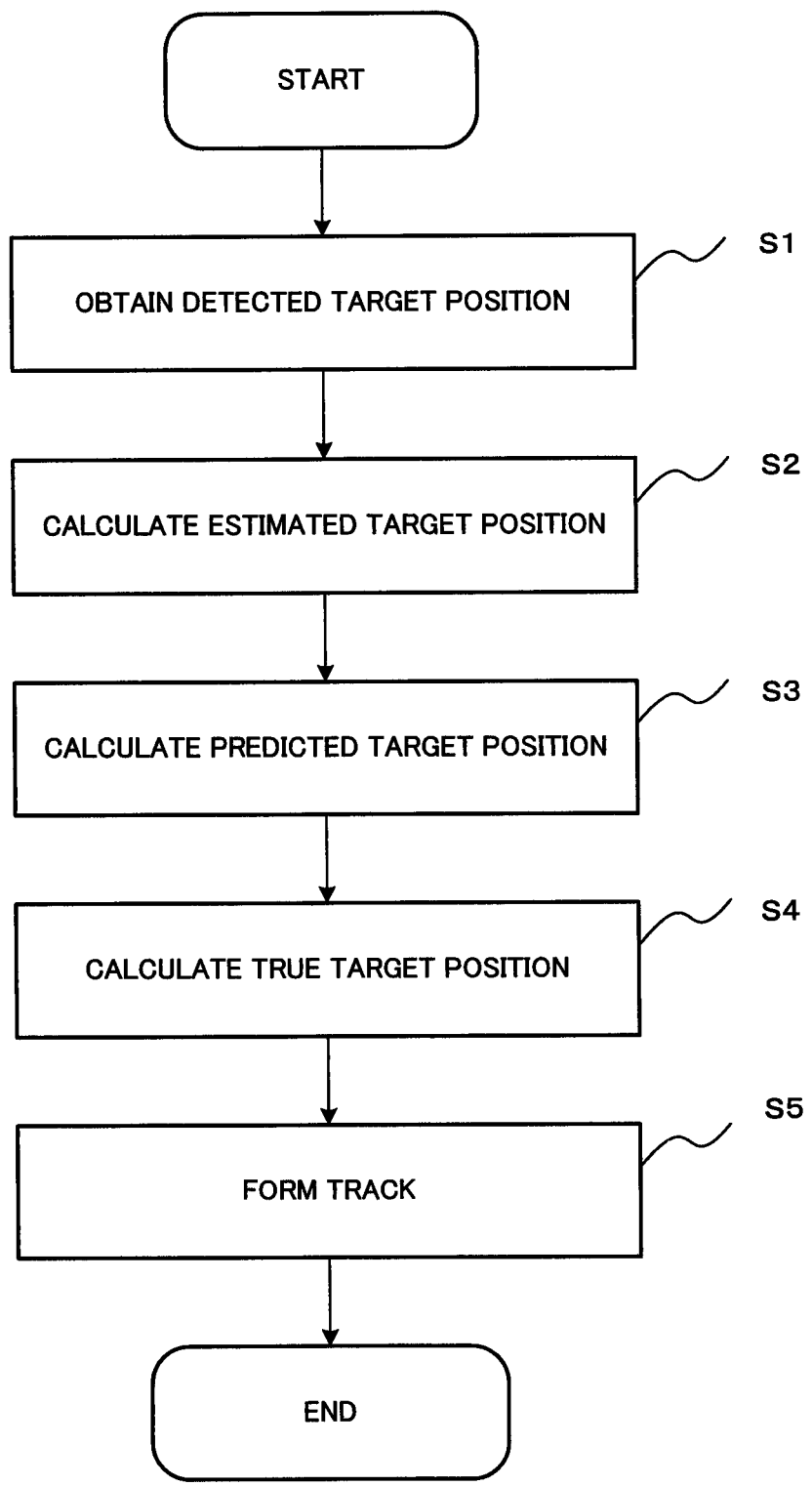
FIG. 2 is a flow chart showing an operation of a target tracking system according to the first exemplary embodiment.

An operation of such target tracking system will be described according to FIG. 2.

Step S1: The detector 12 receives signals of received waves received by the data input part 10 first, and performs target position detection processing for detecting target positions. Detected target positions which have been detected are inputted to the estimation part 19 of the estimation units 20.

Step S2: To the estimation part 19, predicted target positions are inputted from the prediction part 18, and detected target positions are inputted from the detector 12 as stated before. Accordingly, the estimation part 19 calculates target positions by a method of maximum likelihood or the like, for example, using the detected target positions and the predicted target positions, and outputs the calculated results. The calculated target positions are outputted to the prediction part 18 as estimated target positions. Meanwhile, as mentioned later, these calculated target positions are also outputted to the track formation unit 14 as true target positions this time.

Step S3: To the prediction part 18, fluctuations from the fluctuation distribution unit 16 is inputted, and the estimated target positions are inputted from the estimation part 19. Then, the prediction part 18 generates a movement model which takes in the fluctuations received from the fluctuation distribution unit 16 into motion parameters stored in advance, and calculates predicted target positions by applying the movement model to the estimated target positions using a plurality of virtual particles. The calculated predicted target positions are outputted to the estimation part 19.

Step S4: As stated before, the estimation part 19 calculates target positions based on predicted target positions and detected target positions, and outputs them to the track formation unit 14 as true target positions.

Step S5: The track formation unit 14 generates tracks of received true target positions and outputs them to the track output part.

Thus, when a particle filter is applied to Multiple Hypothesis Tracking Method, the particle filter is carried out independently for each track. Also, when target positions are predicted in the next search, fluctuations by pseudo-random numbers or the like are added to internal parameters of each virtual particle. Because independence is required for these fluctuations, a pseudo-random number is generated with respect to each virtual particle. Although the number of times of generation of a pseudo-random number also increases along with increase of the number of virtual particles, the number of times of pseudo-random number generation can be suppressed substantially by sharing such fluctuations by such pseudo-random number among different tracks. After that, the calculation load is reduced by reusing these pseudo-random numbers.

As it has been described above, because common fluctuations are added among tracks when predicting target positions by acquiring signal waves of such as a radar, a sonar and a lidar, even when a particle filter is applied to Multiple Hypothesis Tracking, increase of the calculation amount comes to be able to be suppressed.

Second Exemplary Embodiment

Figure 3:
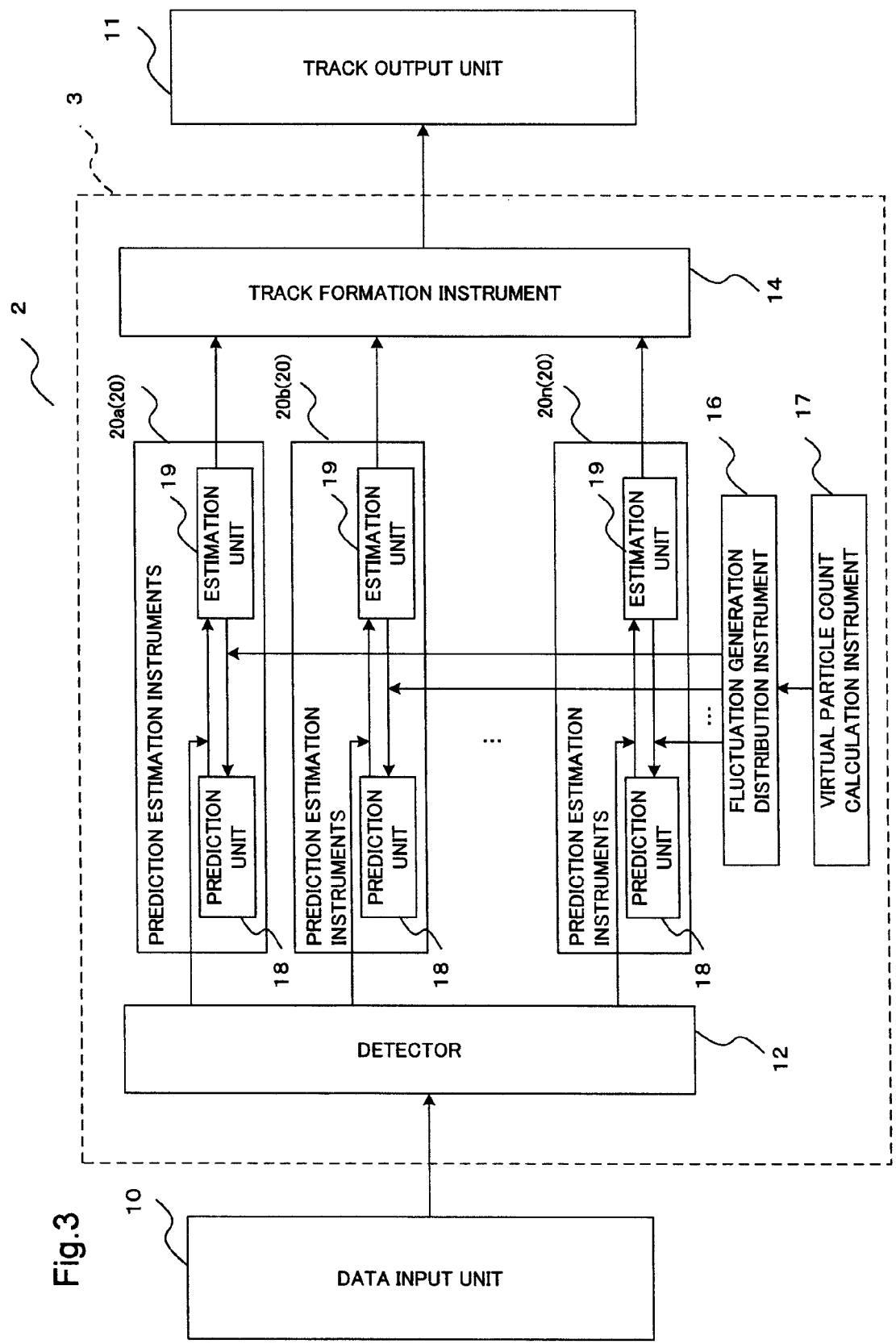
FIG. 3 is a block diagram of a target tracking system according to a second exemplary embodiment of the present invention.

Next, the second exemplary embodiment of the present invention will be described. Meanwhile, to a same structure as the first exemplary embodiment, an identical symbol is given and description will be omitted appropriately. FIG. 3 is a block diagram of a target tracking system according to this exemplary embodiment.

In the second exemplary embodiment, a calculation unit 17 which calculates the number of the virtual particles is added to the first exemplary embodiment.

In the calculation unit 17, using a statistical parameter such as a probability that, in spite of distributions of the virtual particles being the same between different detected target positions, they are deemed to be different from each other, and a probability that, in spite of distributions of the virtual particles being not the same between different detected target positions, they are deemed to be the same, the number of the virtual particles which is enough for determining whether statistics values, such as an average value and a dispersion value of distribution of the virtual particles, are equal or not between different detected target positions is calculated. Then, when determining that the number of the virtual particles is enough, it is outputted to the fluctuation distribution unit 16 as a required virtual particle count.

The fluctuation distribution unit 16 generates fluctuations so that the virtual particles corresponding to the required virtual particle count are generated.

Here, it is supposed that a probability that, in spite of the distributions of the virtual particles being the same between different detected target positions, they are deemed to be different from each other is $\alpha$, and a probability that, in spite of the distributions of the virtual particles being not the same between different detected target positions, they are deemed to be the same is $\beta$.

It is supposed that, when an integral in a domain where a numerical value is x or more is represented as $z_x$ for a normal distribution, the number of virtual particles required to determine whether a null hypotheses that distributions of the virtual particles are equal between different detected target positions is true or not is n.

On this occasion, the number of required virtual particles n is given in formula I statistically according to Yasushi Nagata ("How to decide a sample size", Asakura Shoten, 2003), for example.

$$n \approx \left[\frac{Z_{\alpha/2} - Z_{1-\beta}}{\Delta}\right]^2 + \frac{Z_{\alpha/2}^2}{2} \quad (1)$$

Here, $\Delta$ is a numerical value obtained by dividing a difference between the average values of two distributions of the virtual particles by the distribution of the virtual particles. In other words, it is a Mahalanobis distance between the average values of two virtual particle distributions.

Because, as a result, the number of virtual particles of the necessity minimum can be calculated, the calculation amount can be suppressed to the minimum necessary level.

Third Exemplary Embodiment

Next, the third exemplary embodiment of the present invention will be described. Meanwhile, description will be omitted appropriately using an identical code about a same structure as the first exemplary embodiment.

In the exemplary embodiments described above, the fluctuation formation distribution unit 16 generates fluctuations independently with the other components. Generated fluctuations determine the distribution of the virtual particles used for calculation of the predicted target positions in the prediction part 18.

Accordingly, when the distribution of the virtual particles is made be a more appropriate distribution, accuracy of the true target position acquired finally improves.

From such view point, in this exemplary embodiment, it is arranged such that distribution profiles of the fluctuations are decided based on the virtual particle distribution profile which has been the base of the calculation of an estimated target positions in the fluctuation distribution unit 16.

For example, when likelihood is obtained by the estimation part 19, a method to make the distribution profiles of the virtual particles in the next search proportional to the distribution shape of the virtual particles decided by this likelihood can be applied.

Figure 4:
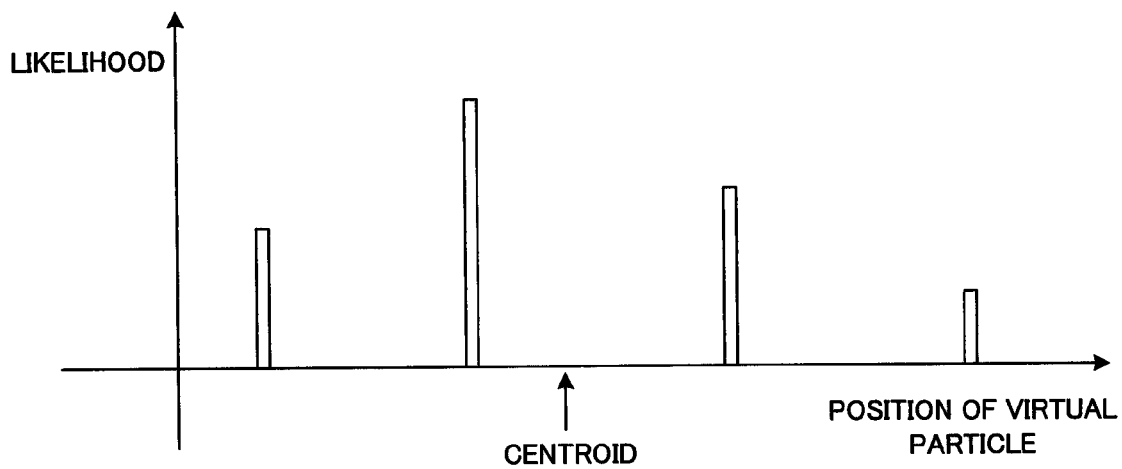
FIG. 4 is a diagram showing a case where the distribution of virtual particles in a target tracking system is of one dimension according to a third exemplary embodiment of the present invention.
Figure 5:
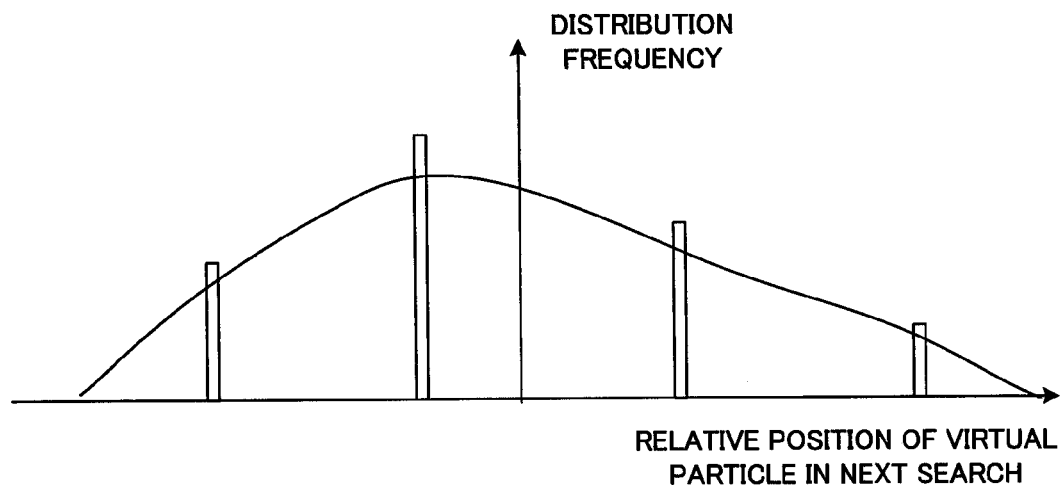
FIG. 5 is a diagram showing a distribution curve formed by an envelope curve of likelihood in a target tracking system according to the third exemplary embodiment.

This method will be described with reference to FIG. 4 and FIG. 5. FIG. 4 is a diagram showing the distribution of the virtual particles in a case where it is one dimensional. FIG. 5 is a new distribution curve generated by an envelope of likelihood.

As shown in FIG. 4, the centroid position of all of each likelihood can be defined. Accordingly, as shown in FIG. 5, a curve line which links the vertexes of a bar graph of likelihood smoothly is generated, and this curve line is made be a new distribution curve having the centroid position of the likelihood as the origin. As a generation method of a curve line linking smoothly, a publicly known method such as spline interpolation can be applied, for example.

Thus, by setting a distribution of the virtual particles used in target position prediction processing by feedback processing, accuracy of a true target position improves.

Fourth Exemplary Embodiment

Next, the fourth exemplary embodiment of the present invention will be described. Meanwhile, the description will be omitted appropriately using an identical code about a same structure as the first exemplary embodiment.

The estimation part 19 performs target position estimation processing for estimating the estimated target positions based on the predicted target positions and the detected target positions. On this occasion, it is premised that the data input part 10 receives the received waves from the targets continuously.

However, for example, in the radar and the sonar, there occurs a case where the target position cannot be detected continuously due to a noise, a clatter, a reverberation or the like (where the target is failed to be searched), or where the noise or the like is mistaken for the received wave from the target, and the detected target positions exceeds a range set in advance relative to the predicted target positions. Hereinafter, such case is described as a target search failure.

In particular, when the detected target positions are not detected, target position estimation processing in each of the exemplary embodiments mentioned above that is premised on existence of the predicted target positions and the detected target positions cannot be performed any more. When the detected target positions exceed the range set in advance relative to the predicted target positions, there might be a large error included in a calculated estimated target positions.

Accordingly, according to this exemplary embodiment, the estimation part 19 outputs the predicted target positions from the prediction part 18 as the estimated target positions so that target tracking can be performed even in such cases.

As a result, even if the target search failure occurs, tracking of a target becomes available to be continued without including the large error.

Fifth Exemplary Embodiment

Next, the fifth exemplary embodiment of the present invention will be described. Meanwhile, the description will be omitted appropriately using an identical code about a same structure as the first exemplary embodiment. This exemplary embodiment relates to processing for a case where a target search failure is repeated.

When the target search failure is repeated, there occurs an event where same true target positions are outputted from the estimation part to a track. In such cases, it is desirable to stop target tracking processing in order to reduce a load of a data processing resource, supposing that a target has been lost sight of.

Accordingly, when the target search failure continues and the number of times set in advance is reached or when the target search failures occur at a frequency set in advance, it is supposed that a target has been lost sight of, and tracking processing in the target tracking system is stopped.

Stoppage of the target tracking system can be determined by the detector 12 based on the detection result of the target positions, or by the track formation unit 14 watching track information. Then, results of such determination are indicated to the estimation units 20 and the like.

As the results, the resource load by the target search failure can be reduced, and misunderstanding of the track by a user due to outputting the target position of poor accuracy can be prevented.

Sixth Exemplary Embodiment

Next, the sixth exemplary embodiment of the present invention will be described. Meanwhile, description will be omitted appropriately using an identical code about a same structure as the first exemplary embodiment.

A case where a state that the distance between the estimated target positions of different tracks are within the range set in advance continues for a predetermined number of times or a case where a pattern set in advance continues can occur. In such cases, computing power required for prediction and estimation can be saved by regarding targets as one target practically and unifying them into one rather than managing as a plurality of tracks.

Accordingly, in this exemplary embodiment, when such situation occurs, the track formation unit 14 instructs the estimation units 20 to integrate tracks into one.

As a result, the resource of the estimation units 20 comes to be able to be used efficiently. By integrating a plurality of tracks, it becomes easy for a user to comprehend a track.

The whole or part of the exemplary embodiments disclosed above can be described as, but not limited to, the following Supplementary notes.

Supplementary Note 1.

A target tracking system which tracks targets using a plurality of virtual particles, comprising:

a detector which detects the targets based on a signal wave from the targets and outputs detected results as detected target positions;

a fluctuation distribution unit which generates fluctuations arising from at least disturbances and measurement errors; and an estimation unit which sets the virtual particles based on the fluctuations and estimates true target positions based on the detected target positions.

Supplementary Note 2.

The target tracking system according to Supplementary note 1, wherein the detector detects a plurality of the targets from the signal wave continuously or at a time interval set in advance, and a plurality of the estimation units calculates the true target position, respectively.

Supplementary Note 3.

The target tracking system according to Supplementary note 2, the estimation unit further comprising:

a prediction part which predicts positions of the targets as predicted target positions; and an estimation part which estimates the true target position based on a plurality of the predicted target positions from the prediction part, wherein the prediction part stores a motion parameter related to at least an initial position, a speed and an acceleration of the targets and a movement model including the fluctuations from the fluctuation distribution unit, and predicts, according to the estimated target positions, a positions of the targets at predetermined timing in a future set in advance using a plurality of the virtual particles on a target-by-target basis, the predetermined timing occurring after current target detection timing.

Supplementary Note 4.

The target tracking system according to Supplementary note 3, wherein the fluctuation distribution unit stores the fluctuations arising from disturbances and measurement errors of the motion parameter as random numbers of a distribution profile given in advance, generates among different ones of the detected target positions, the fluctuations having a same shape of probability distribution of the fluctuation although a total width of the fluctuation probability distribution is different from each other, generates among the virtual particles for identical the detected target positions, the fluctuations of probability distribution in which a width and a shape of the fluctuation probability distribution is different from each other, and generates the fluctuations corresponding to the increased number of the target when a number of the detected target is increased.

Supplementary Note 5.

The target tracking system according to any one of Supplementary notes 1 to 4, further comprising:

a track formation unit which generates trucks made by lining the true target position estimated by the estimation part in time series.

Supplementary Note 6.

The target tracking system according to any one of Supplementary notes 1 to 5, further comprising:

a calculation unit which calculates the number of the virtual particles, using as parameter at least one of probabilities that, in spite of distributions of the virtual particles being same between different the detected target positions, the distributions are deemed to be different from each other, and probabilities that, in spite of distribution of the virtual particles being not same between different the detected target positions, the distributions are deemed to be same, a number of the virtual particles required for determining whether at least one of an average value and a dispersion value of probability distribution of the virtual particles is equal or not between different the detected target positions as a required virtual particle count, and which make fluctuation distribution unit generate the virtual particles corresponding to the required virtual particle count.

Supplementary Note 7.

The target tracking system according to any one of Supplementary notes 1 to 6, wherein the fluctuation distribution unit determines a distribution profile of the fluctuations based on a shape of probability distribution of the virtual particles at a time of calculating the estimated target positions.

Supplementary Note 8.

The target tracking system according to any one of Supplementary notes 1 to 7, wherein the estimation part determines whether the detected target positions are included in a range from the predicted target position set in advance relative to the predicted target positions, and, when determining as not included in the range, makes the predicted target positions be the true target position.

Supplementary Note 9.

The target tracking system according to any one of Supplementary notes 1 to 7, wherein, the track formation unit outputs an instruction to stop prediction-estimation processing to the estimation units, supposing that the targets have been lost sight of, when determination that the detected target positions are not included in a range from the predicted target position set in advance relative to the predicted target position continues for a number of times set in advance or reaches a frequency set in advance.

Supplementary Note 10.

The target tracking system according to any one of Supplementary notes 1 to 7, wherein the track formation unit determines whether a distance between the estimated target positions of different the tracks is included in a predetermined range or not, and, when determination as being included continues for a number of times set in advance or repeats with a pattern set in advance, instructs the estimation units to unify the different tracks into one track.

Supplementary Note 11.

A target tracking method for tracking targets using a plurality of virtual particles, comprising:

a detection procedure for detecting the targets based on a signal wave from the targets and for outputting detected results as detected target positions;

a fluctuation procedure for generating fluctuations arising from at least disturbances and measurement errors; and an estimation procedure for setting the virtual particles based on the fluctuations and for estimating a true target positions based on the detected target positions.

Supplementary Note 12.

The target tracking method according to Supplementary note 11, wherein the detection procedure detects a plurality of the targets from the signal wave continuously or at a time interval set in advance, and a plurality of the estimation procedures calculate and output the true target positions, respectively.

Supplementary Note 13.

The target tracking method according to Supplementary note 12, the estimation procedure further comprising:

a prediction procedure for predicting positions of the targets as predicted target positions; and an estimation procedure for estimating the true target positions of the targets based on a plurality of the predicted target positions from the prediction part, wherein the prediction procedure stores a motion parameter related to at least an initial position, a speed and an acceleration of the target and a movement model including the fluctuations from the fluctuation distribution unit, and predicts, according to the estimated target positions, a position of the target at predetermined timing in a future set in advance using a plurality of the virtual particles on a target-by-target basis, the predetermined timing occurring after current target detection timing.

Supplementary Note 14.

The target tracking method according to Supplementary note 13, wherein the fluctuation procedure stores the fluctuations arising from the disturbances and the measurement errors of the motion parameter as random numbers of a distribution profile given in advance, generates among different ones of the detected target positions, the fluctuation having a same shape of probability distribution of the fluctuation although a total width of the fluctuation probability distribution is different from each other, generates among the virtual particles for identical the detected target positions, the fluctuations of probability distribution in which a width and a shape of the fluctuation probability distribution is different from each other, and generates the fluctuations corresponding to the increased number of the targets when a number of the targets that have been detected is increased.

Supplementary Note 15.

The target tracking method according to any one of Supplementary notes 11 to 14, further comprising:

a track formation procedure for generating trucks made by lining the true target positions estimated by the estimation part in time series.

Supplementary Note 16.

The target tracking method according to any one of Supplementary notes 11 to 15, further comprising:

a calculation procedure for calculating of the virtual particle count, using as a parameter at least one of a probability that, in spite of distributions of the virtual particles being same between different the detected target positions, the distributions are deemed to be different from each other, and a probability that, in spite of distributions of the virtual particles being not same between different the detected target positions, the distributions are deemed to be same, a number of the virtual particles required for determining whether at least one of an average value and a dispersion value of probability distribution of the virtual particles is equal or not between different the detected target positions as a required virtual particle count, and for making fluctuation procedure generate the virtual particles corresponding to the required virtual particle count.

Supplementary Note 17.

The target tracking method according to any one of Supplementary notes 11 to 16, wherein the fluctuation procedure determines a distribution profile of the fluctuations based on a shape of distribution of the virtual particles at a time of calculating the estimated target positions.

Supplementary Note 18.

The target tracking method according to any one of Supplementary notes 11 to 17, wherein the estimation procedure determines whether the detected target positions are included in a range from the predicted target position set in advance relative to the predicted target positions, and, when determining as not included in the range, makes the predicted target positions be the true target position.

Supplementary note 19.

The target tracking method according to any one of Supplementary notes 11 to 17, wherein, the track formation procedure makes estimation processing stop, supposing that the target has been lost sight of, when determination that the detected target positions are not included in a range from the predicted target position set in advance relative to the predicted target position continue for a number of times set in advance or reaches a frequency set in advance.

Supplementary Note 20.

The target tracking method according to any one of Supplementary notes 11 to 17, wherein the track formation unit determines whether a distance between the estimated target positions of different the tracks is included in a predetermined range or not, and, when determination as being included continues for a number of times set in advance or repeats with a pattern set in advance, unifies the different tracks into one track.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. A target tracking system which tracks targets using a plurality of virtual particles, comprising:
   a detector which detects the targets based on a signal wave from the targets and outputs detected results as detected target positions;
   a fluctuation distribution unit which generates fluctuations arising from at least disturbances and measurement errors;
   an estimation unit which sets the virtual particles based on the fluctuations and estimates a true target positions based on the detected target positions;
   a prediction part which predicts positions of the targets as predicted target positions; and
   an estimation part which estimates the true target positions based on a plurality of the predicted target positions from the prediction part,
   wherein,
   the detector detects a plurality of the targets from the signal wave continuously or at a time interval set in advance,
   a plurality of the estimation units calculate the true target positions, respectively, and
   the prediction part stores a motion parameter related to at least an initial position, a speed and an acceleration of the targets and a movement model including the fluctuations from the fluctuation distribution unit, and predicts, according to the estimated target positions, positions of the targets at predetermined timing in a future set in advance using a plurality of the virtual particles on a target-by-target basis, the predetermined timing occurring after current target detection timing.

2. The target tracking system according to claim 1, wherein the fluctuation distribution unit
   stores the fluctuations arising from disturbances and measurement errors of the motion parameter as random numbers of a distribution profile given in advance,
   generates among different ones of the detected target positions, the fluctuations having a same shape of probability distribution of the fluctuation although a total width of the fluctuation probability distribution is different from each other,
   generates among the virtual particles for identical the detected target positions, the fluctuations of probability distribution in which a width and a shape of the fluctuation probability distributions is different from each other, and
   generates the fluctuations corresponding to the increased number of the targets when a number of the targets that have been detected are increased.

3. A target tracking method for tracking a target using a plurality of virtual particles, comprising:
   a detection procedure for detecting the targets based on a signal wave from the targets and for outputting detected results as detected target positions;
   a fluctuation procedure for generating fluctuations arising from at least disturbances and measurement errors;
   an estimation procedure for setting the virtual particles based on the fluctuations and for estimating a true target positions based on the detected target positions;
   a prediction procedure for predicting positions of the targets as predicted target positions; and
   an estimation procedure for estimating the true target positions of the target based on a plurality of the predicted target positions from the prediction part,
   wherein,
   the detection procedure detects a plurality of the targets from the signal wave continuously or at a time interval set in advance,
   a plurality of the estimation procedures calculate and output the true target positions, respectively, and
   the prediction procedure stores a motion parameter related to at least an initial position, a speed and an acceleration of the targets and a movement model including the fluctuations from the fluctuation procedure, and predicts, according to the estimated target positions, positions of the targets at predetermined timing in a future set in advance using a plurality of the virtual particles on a target-by-target basis, the predetermined timing occurring after current target detection timing.

4. The target tracking method according to claim 3, wherein the fluctuation procedure
   stores the fluctuations arising from the disturbances and the measurement errors of the motion parameter as random numbers of a distribution profile given in advance,
   generates among different ones of the detected target positions, the fluctuation having a same shape of probability distribution of the fluctuation although a total width of the fluctuation probability distribution is different from each other,
   generates among the virtual particles for identical the detected target positions, the fluctuations of probability distribution in which a width and a shape of the fluctuation probability distribution is different from each other, and
   generates the fluctuations corresponding to the increased number of the targets when a number of the targets that have been detected are increased.

5. The target tracking method according to claim 3, further comprising:
   a track formation procedure for formation of a track of the target by lining up in time series the true target positions obtained by the estimation procedure.

6. The target tracking method according to claim 3, further comprising:
   a track formation procedure for forming a track of the target by storing true target positions obtained for each search in a memory, and about each true target position, simultaneously storing a pointer indicating an area of the memory which stores the previous true target position by the last search by which the current true target position has been calculated.

7. The target tracking system according to claim 1, further comprising:
   a track formation unit which generates a track of the target by lining up in time series the true target positions obtained by the estimation part.

8. The target tracking system according to claim 1, further comprising:
   a track formation unit that generates a track of the target by storing true target positions obtained for each search in a memory, and about each true target position, simultaneously storing a pointer indicating an area of the memory which stores the previous true target position by the last search by which the current true target position has been calculated.

* * * * *